United States Patent [19]

Hsieh

[11] Patent Number: 5,363,880

[45] Date of Patent: Nov. 15, 1994

[54] HOT/COLD WATER MIXING FAUCET WITH WATER TEMPERATURE CONTROL

[76] Inventor: Yung-Li Hsieh, No. 29 Pyi-Tou Lane, Ding-Fan Li Lu Kang Cheng, Chang Hwa Hsien, Taiwan, Prov. of China

[21] Appl. No.: 185,002

[22] Filed: Jan. 24, 1994

[51] Int. Cl.⁵ .......................... F16K 11/076
[52] U.S. Cl. ............... 137/625.17; 137/625.4; 251/105; 251/288
[58] Field of Search ............ 137/625.17, 625.9; 251/105, 288

[56] References Cited

U.S. PATENT DOCUMENTS

| | | | |
|---|---|---|---|
| 3,591,137 | 7/1971 | Billeter | 251/105 X |
| 4,610,272 | 9/1986 | Gottwald et al. | 137/625.17 |
| 4,733,688 | 3/1988 | Lorch | 137/625.17 X |
| 5,082,023 | 1/1992 | D'Alayer de Costemore d'Arc | 137/625.17 X |
| 5,183,073 | 2/1993 | Roberts | 251/105 X |

Primary Examiner—John Rivell
Attorney, Agent, or Firm—Bacon & Thomas

[57] ABSTRACT

A hot/cold water mixing faucet includes a conical bonnet fastened to the faucet body thereof at the top and fixed in position by a flush bolt, which has a longitudinal stop edge on the outside to limit the turning angle of the handle of the faucet, and a spring-supported stop member mounted on the handle and having a front stop bar stopped against the a low-level surface on the conical bonnet at one side of the longitudinal stop edge, whereby the conical bonnet can be set at the desired position closer to the hot water inlet or the cold water inlet, by means of controlling the flush bolt, so as to limit the maximum output water temperature within the desired range.

1 Claim, 5 Drawing Sheets

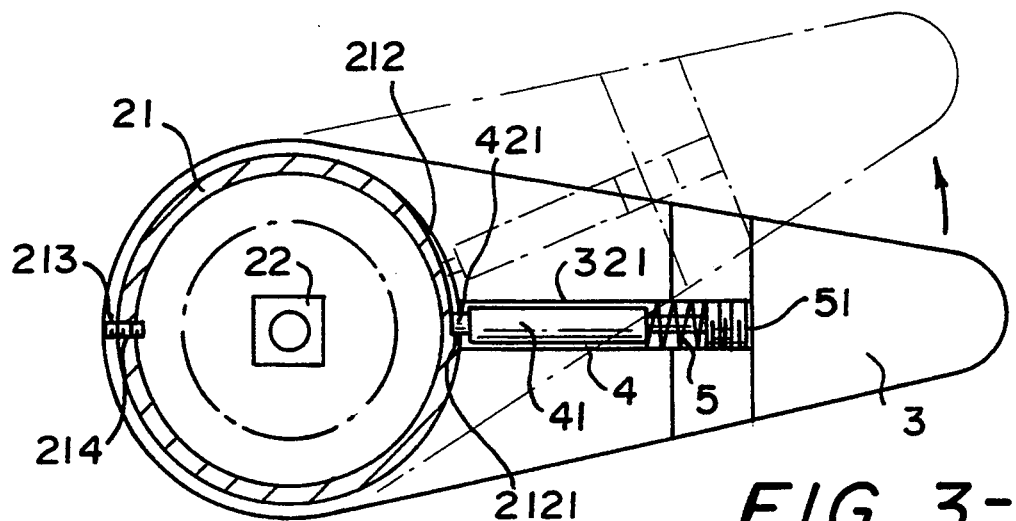
FIG. 3-A
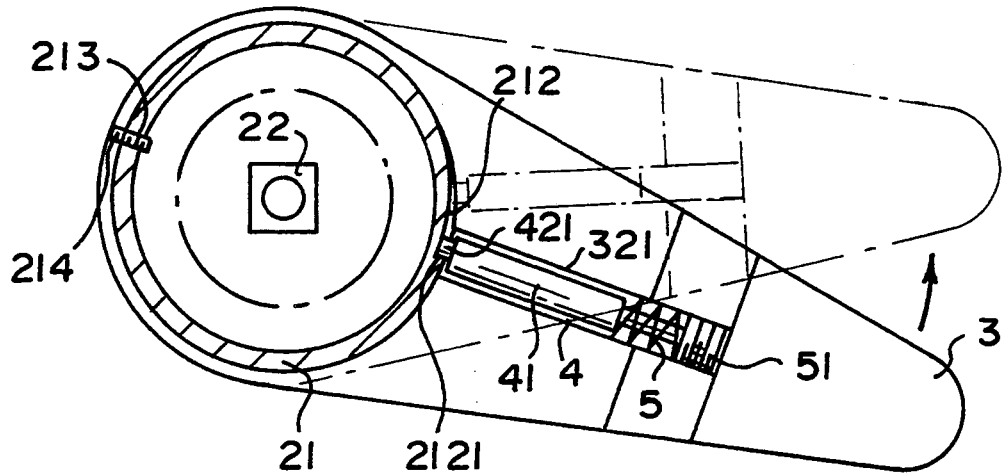
FIG. 3-B
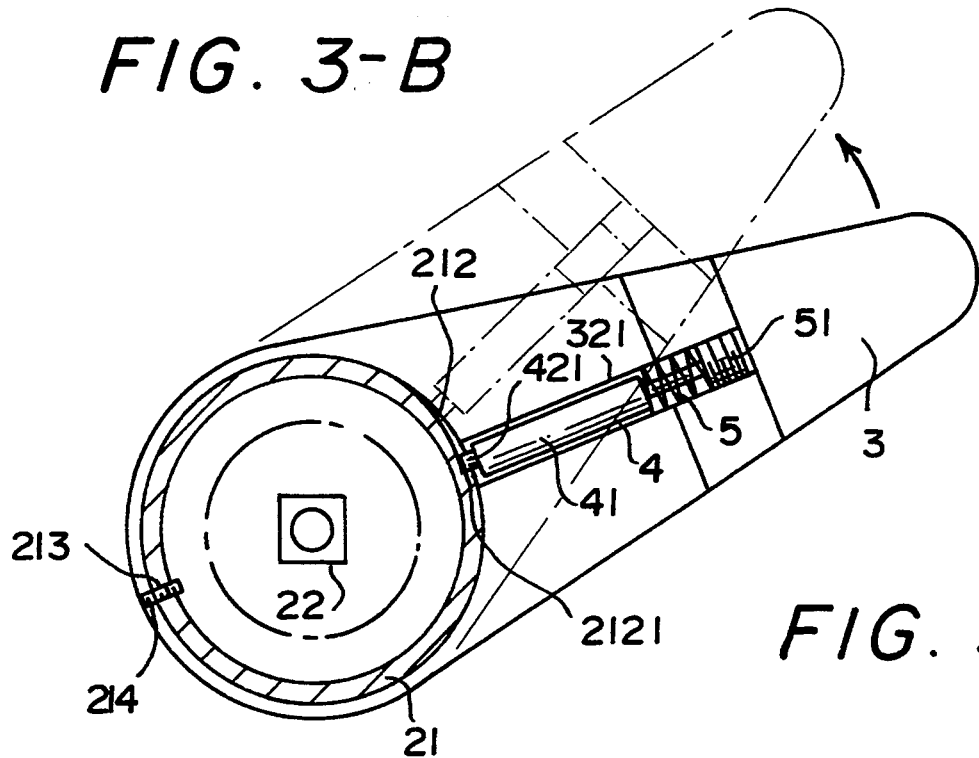
FIG. 3-C

HOT/COLD WATER MIXING FAUCET WITH WATER TEMPERATURE CONTROL

BACKGROUND OF THE INVENTION

The present invention relates to a hot/cold water mixing faucet which can be adjusted to limit the maximum output water temperature within the desired range.

Various hot/cold water faucets have been disclosed, and have appeared on the market. A conventional hot/cold water faucet is generally comprised of a hot water inlet and a cold water inlet controlled by a respective handle via a respective valve stem. This structure of hot/cold water faucet is not practical in use because the control of output water temperature must be made by adjusting the two handles.

There is disclosed another structure of hot/cold water faucet which is controlled by a single handle. When the handle is lifted, the output port of the faucet is opened, and the output water temperature can be easily controlled by turning the handle in either direction. When the handle is lifted and turned to the left limit, the temperature of the output flow of water is at the highest level; on the contrary, when the handle is lifted and turned to the right limit, the temperature of the output flow of water is at the lowest level. Because the most commonly used home water heaters are controlled by a water ignition system, the flow of water will be quickly heated to the desired temperature when the water outlet of the water supply system which passes through a water ignition type water heater is opened. Therefore, one may scald oneself with hot water when the handle of the hot/cold water faucet is lifted from the left limit position, and a burning accident may happen when a young child play the handle of the hot/cold water faucet.

In order to eliminate the aforesaid problem, there is still another structure of hot/cold water faucet which uses a complicated temperature control device to control the temperature of the output flow of water. This structure of hot/cold water faucet allows the user to set the desired water temperature. However, this structure of hot/cold water faucet is very expensive (about three times over the cost of a regular hot/cold water faucet), and the complicated temperature control device may be damaged easily due to unstable water pressure.

A normal home water heater can heat water over 75° C. However, in normal conditions, the optimum water temperature for washing and bathing is maintained within 35° C. to 40° C. Therefore, it is practical to limit the maximum output water temperature of a hot/cold water within a suitable range.

SUMMARY OF THE INVENTION

The present invention has been accomplished under the aforesaid circumstances. It is therefore the principal object of the present invention to provide a hot/cold water mixing faucet which eliminates the aforesaid drawbacks and problems. It is another object of the present invention to provide a hot/cold water mixing faucet which can be adjusted to limit the maximum output water temperature within the desired range. It is still another object of the present invention to provide a hot/cold water mixing faucet which can be temporarily unlocked to let hot water out of the faucet at the full flow rate when the maximum output water temperature of the faucet is set at a lower level. It is still another object of the present invention to provide a hot/cold water mixing faucet which is simple in structure and durable in use. It is still another object of the present invention to provide a hot/cold water mixing faucet which is inexpensive to manufacture.

According to one aspect of the present invention, a hot/cold water mixing faucet comprises conical bonnet fastened to the faucet body thereof at the top and fixed in position by a flush bolt, which has a longitudinal stop edge on the outside to limit the turning angle of the handle of the faucet, and a spring-supported stop member made to slide in a longitudinal sliding hole on a bottom block on the handle and having a front stop bar stopped against the a low-level surface on the conical bonnet at one side of the longitudinal stop edge, whereby the conical bonnet can be set at the desired position closer to the hot water inlet or the cold water inlet, by means of controlling the flush bolt, so as to limit the maximum output water temperature within the desired range. Therefore, the hot/cold water mixing faucet is safe in use and no burning accident will happen when the conical bonnet is set at a position relatively closer to the cold water inlet.

According to another aspect of the present invention, the spring-supported stop member has a rear projecting bar extended out of the bottom block of the handle. When the rear projecting bar of the stop member is pulled backwards to move the curved bottom end of the front stop bar of the stop member away from the conical bonnet, the handle can then be turned on the conical bonnet to the limit to let hot water out of the faucet at the full flow rate.

BRIEF DESCRIPTION OF THE DRAWINGS

The present invention will now be described by way of example only with reference to the annexed drawings, in which:

FIG. 1-A is a transverse view in section of the conical bonnet of the faucet shown in FIG. 1;

FIG. 1-B is a longitudinal view in section of the conical bonnet of the faucet shown in FIG. 1;

FIG. 3-A shows the conical bonnet of the faucet of FIG. 1 set at the medium level position and the handle thereof operated;

FIG. 3-B shows the conical bonnet of the faucet of FIG. 1 set at the high level position and the handle thereof operated;

FIG. 3-C shows the conical bonnet of the faucet of FIG. 1 set at the low level position and the handle thereof operated;

FIG. 4-A shows the curved bottom end of the front stop bar of the stop member turned from the low-level surface over the longitudinal stop edge of the conical bonnet.

DETAILED DESCRIPTION OF THE PREFERRED EMBODIMENT

Figure 1:
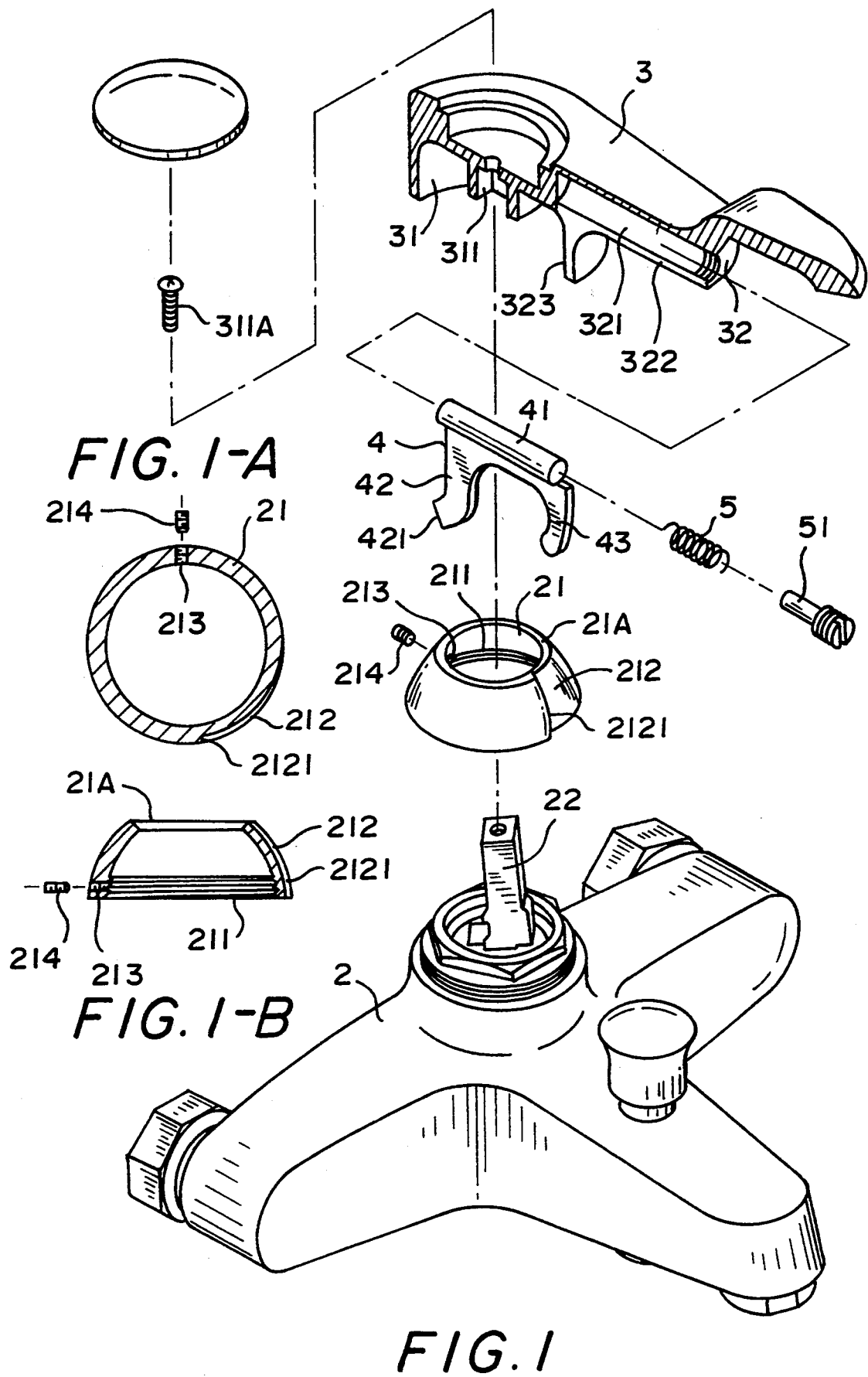
FIG. 1 is an exploded view of a hot/cold water mixing faucet according to the preferred embodiment of the present invention.
Figure 2:
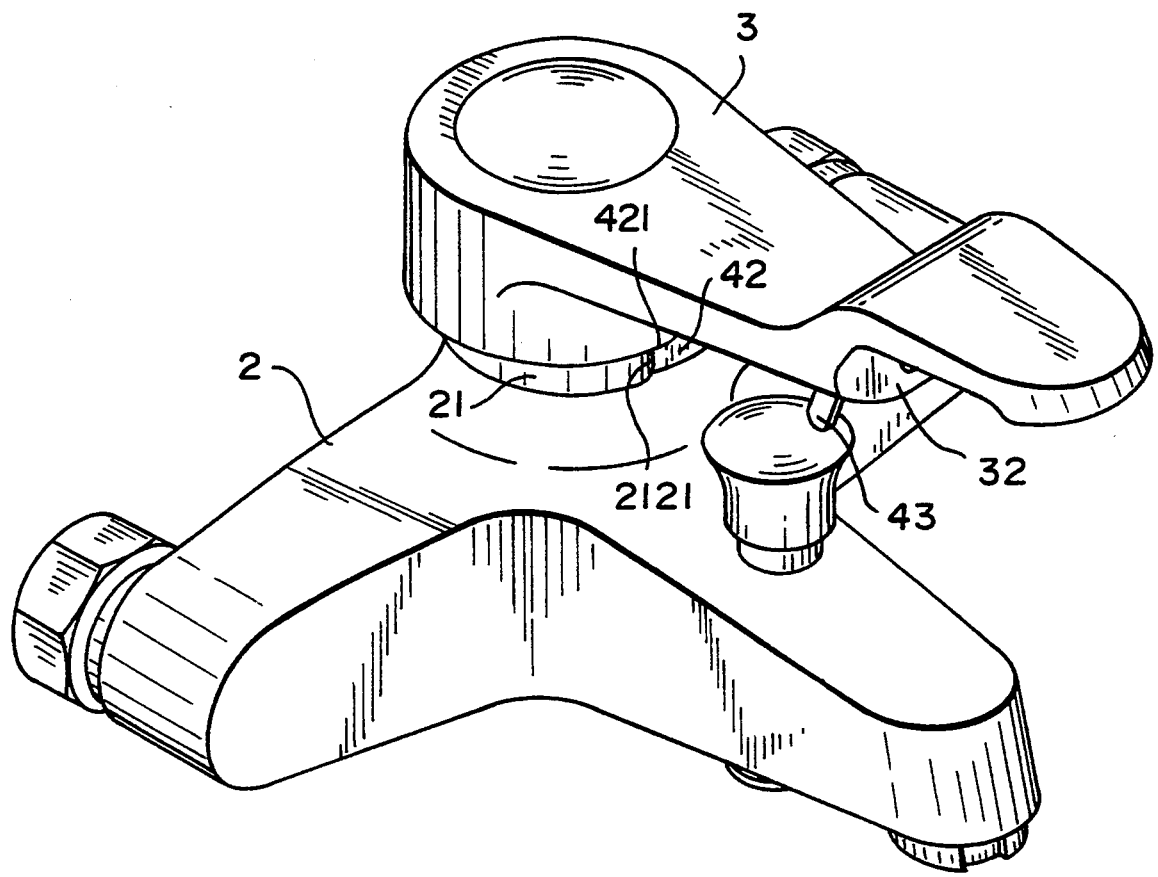
FIG. 2 is an elevational view of the faucet shown in FIG. 1.

Referring to FIGS. 1, 1-A, 1-B, and 2, a hot/cold water mixing faucet with water temperature control in accordance with the present invention is generally comprised of a faucet body 2, a handle 3, a conical bonnet 21, a stop member 4, and a valve stem 22.

The conical bonnet 21 is made gradually bigger toward the bottom, comprising an inner thread 211 at the bottom fastened to (an outer thread on) the faucet body 2 at the top, a top opening 21A in the center providing a space for movement of the valve stem 22, a longitudinal low-level surface 212 facing the cold water inlet and providing a curved stop edge 2121, a screw hole 213 spaced from the curved stop edge 2121 at an opposite location, and a flush bolt 214 threaded into the screw hole 213 and projecting into the inside space of the conical bonnet 21.

The handle 3 comprises a unitary, cylindrical socket 31 at one end, a valve stem holder 311 inside the socket 31, to which the valve stem 22 is fastened by a screw 311A, a longitudinal bottom block 32 perpendicularly extended from the socket 31, and a vertical bottom plate 323 perpendicularly and downwardly extended from the longitudinal bottom block 32 at an inner side and spaced around the socket 31. The longitudinal bottom block 32 comprises a longitudinal sliding hole 321 extended to the outer end thereof, and a longitudinal gap 322 at the bottom communicated with the sliding hole 321.

The stop member 4 comprises an elongated rail 41 at the top made to slide in the sliding hole 321 on the longitudinal bottom block 32 of the handle 3, a front stop bar 42 and a rear projecting bar 43 respectively extended from two opposite ends of the rail 41 in the same direction. The front stop bar 42 has curved bottom end 421 fitting over the outside wall of the conical bonnet 21. When the rail 41 of the stop member 4 is inserted into the sliding hole 321, a spring element 51 is then inserted into the sliding hole 321, and then a fastening element 51 is fastened to the outside end of the longitudinal bottom block 32 to block up the sliding hole 321 maintaining the spring element 5 between the rail 41 of the stop member 4 and the fastening element 51. When installed, the front stop bar 42 and the rear projecting bar 43 extend out of the longitudinal bottom block 32 of the handle 3 through the longitudinal gap 322, and the curved bottom end 421 of the front stop bar 42 passes through the vertical bottom plate 323 and stopped against the conical bonnet 21.

When the conical bonnet 21 is fastened to the faucet body 2 at the top, the valve stem 22 extends out of the conical bonnet 21 through the top opening 21a thereof. Then, the top end of the valve stem 22 is fastened to the valve stem holder 311 by the screw 311A. When assembled, the stop member 4 is pushed forward by the spring element 5 causing the curved bottom end 421 of the front stop bar 42 of the stop member 4 to abut the outside wall of the conical bonnet 21.

Figure 3:
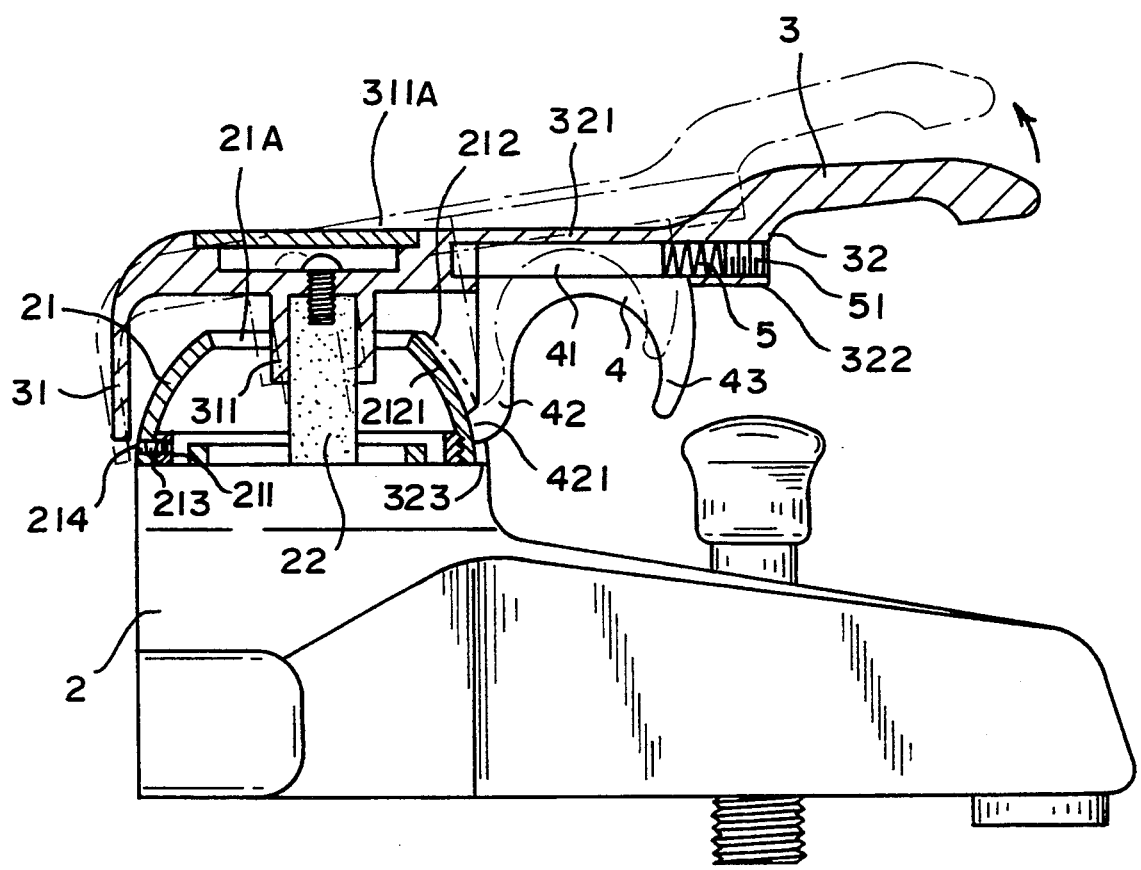
FIG. 3 is a sectional side view of the faucet of FIG. 1 showing the handle thereof operated.

The operation of the present invention is outlined hereinafter with reference to FIGS. 3, 3-A, 3-B, and 3-C.

[A] Setting of normal maximum output water temperature:

After the installation of the faucet, the user can loosen the flush bolt 214 for permitting the conical bonnet 21 to be turned on the faucet body 2 within at least 45° angle in either direction. Turning the conical bonnet 21 on the faucet body 2 in either direction causes the output water temperature limit to be changed. If the stop edge 2121 is disposed in the midway between the hot water outlet and the cold water outlet, as shown in FIG. 3A, the maximum output water temperature is set at a medium level (when the faucet is fully opened, equal volume of cold water and equal volume of hot water are mixed and driven out of the faucet). If the stop edge 2121 is disposed closer to the hot water outlet, as shown in FIG. 3B, the maximum output water temperature is set at a high level (when the faucet is fully opened, much volume of hot water is mixed with less volume of cold water and then driven out of the faucet). If the stop edge 2121 is disposed closer to the cold water outlet, as shown in FIG. 3C, the maximum output water temperature is set at a low level (when the faucet is fully opened, much volume of cold water is mixed with less volume of hot water and then driven out of the faucet)

[B] Operation of normal water output:

When the normal maximum output water temperature is set, the curved bottom end 421 of the front stop bar 42 stops at the outside wall of the conical bonnet 21. When in use, the handle 3 is turned toward the cold water outlet to move the curved bottom end 421 of the front stop bar 42 over the stop edge 2121, permitting the curved bottom end 421 of the front stop bar 42 to stop at the longitudinal low-level surface 212, and therefore the handle 3 is set at the setting of the normal maximum output water temperature (namely, the medium, high, or low level position as shown in FIG. 3-A, 3-B or 3-C). The user can then lift the handle 3 to let a mixed flow of water flow out of the faucet. If the handle 3 is lifted when the curved bottom end 42 of the front stop bar 4 is stopped against the stop edge 2121, the temperature of the output flow of water is at the maximum degree of the set level, and the temperature of the output flow of water will be gradually reduced if the handle 3 is turned to move the curved bottom end 421 of the front stop bar 42 away from the stop edge 2121. If the conical bonnet 21 is set at the medium or low level position, the maximum temperature of the output flow of water does not hurt the skin, and therefore no burning accident will happen even when a young child moves the handle 3.

Figure 4:
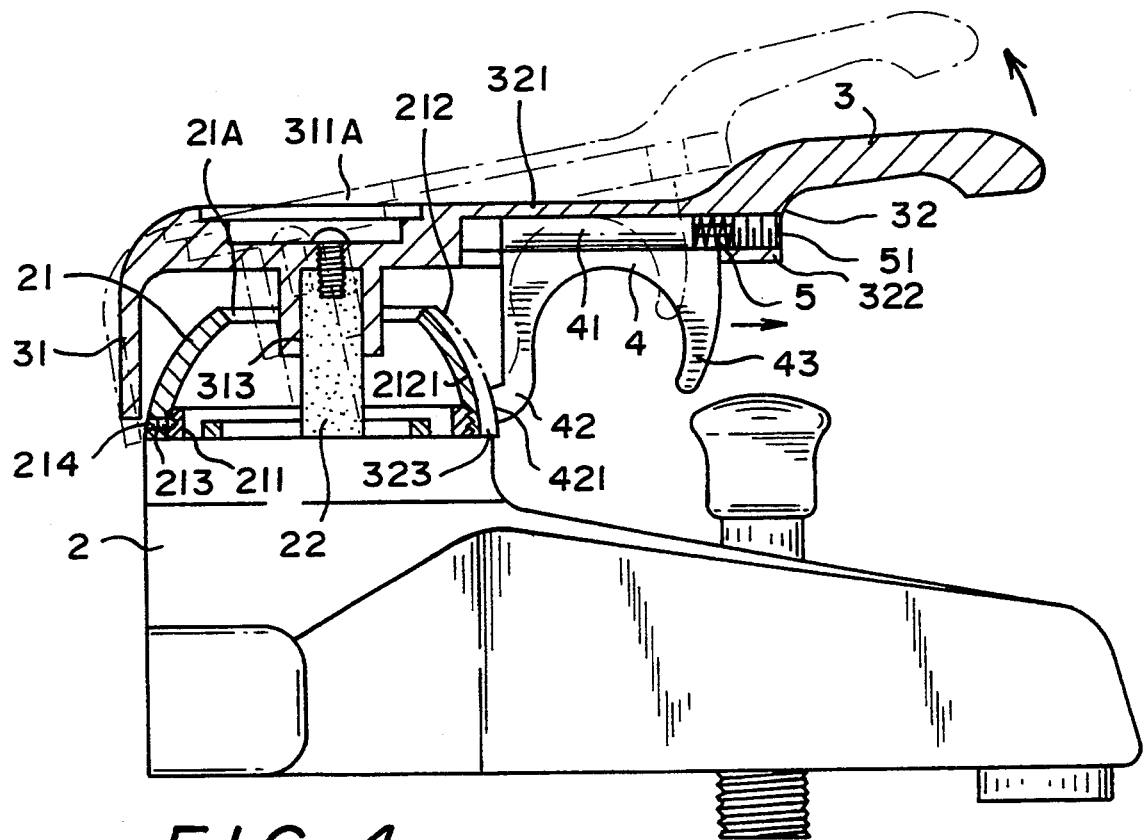
FIG. 4 is similar to FIG. 3 but showing the stop member moved away from the conical bonnet.
Figure 4A:
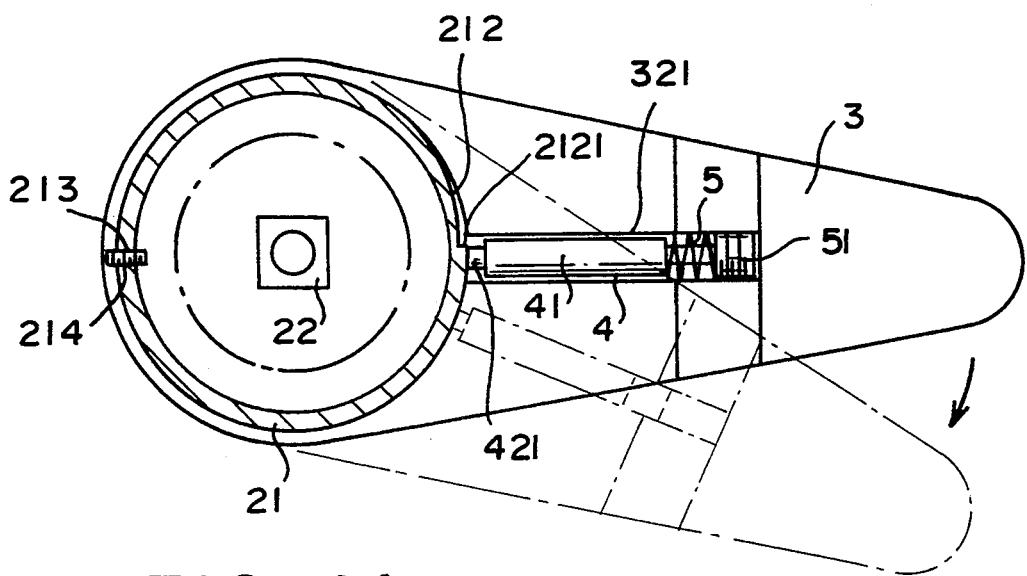

[C] Operation of extraordinary hot water supply:

When the conical bonnet 21 is set at the medium or low level position, the user can pull the rear projecting bar 43 backwards to move the curved front end 421 of the front stop bar 42 away from the stop edge 2121 of the longitudinal low-level surface 212 (see the dotted line shown in FIG. 4) and then turn the handle 3 toward the hot water outlet (see FIG. 4-A), and therefore the user can then lift the handle 3 and turn it to the limit at the hot water outlet side to let how water flow out of the faucet. After the use of hot water, the handle 3 is then turned in the reverse direction to move the curved bottom end 421 of the front stop bar 42 over the stop edge 2121 permitting it to stop at the longitudinal low-level surface 212 again, and therefore the faucet is returned to the set (medium or low) level position.

While only one embodiment of the present invention has been shown and described, it will be understood that various modifications and changes could be made without departing from the spirit and scope of the invention.

What is claimed is:

1. A hot/cold water mixing faucet comprising a faucet body having a cold water inlet and a hot water inlet, a valve stem disposed inside said faucet body, a conical bonnet fastened to the top of the faucet body surrounding the valve stem, a handle fastened to said valve stem at the top and moved to lift and turn said valve stem in controlling the flow rate of hot/cold water being driven from said hot and cold water inlets out of said faucet body, and a stop member mounted on said handle to limit the rotary motion of said handle on said conical bonnet, wherein:

said conical bonnet is made gradually bigger toward the bottom, comprising an inner thread at the bottom threaded onto an outer thread on said faucet body at the top, a top opening in the center, through which said valve stem passes, a longitudinal low-level surface facing said cold water inlet, a curved, longitudinal stop edge raising from said low-level surface at right angles, a screw hole spaced from said curved, longitudinal stop edge at an opposite location, and a flush bolt threaded into the screw hole on said conical bonnet to fix said conical bonnet in position on said faucet body;

said handle comprises a unitary, cylindrical socket vertically disposed at one end thereof at the bottom and mounted around said conical bonnet, a valve stem holder inside said socket, which receives said valve stem permitting said valve stem to be lifted or turned by said handle, a longitudinal bottom block perpendicularly extended from said socket, and a vertical bottom plate perpendicularly and downwardly extended from said longitudinal bottom block at an inner side and spaced around said socket, said longitudinal bottom block comprising a longitudinal sliding hole extended to an outer end thereof, a spring element received inside said longitudinal sliding hole, a fastening element fastened to said longitudinal sliding hole at an outer side to stop said spring element inside said longitudinal sliding hole, and a longitudinal gap at the bottom communicated with said sliding hole;

said stop member comprises an elongated rail received inside said longitudinal sliding hole and supported on said spring element, a front stop bar and a rear projecting bar at two opposite ends of said rail respectively extended out of said longitudinal bottom block through said longitudinal gap, said front stop bar having a curved bottom end stopped against said low-level surface of said conical bonnet and moved by said handle to slide on said low-level surface;

the range of turning angle of said handle on said conical bonnet being adjustable by changing the position of said conical bonnet on said faucet body by loosening said flush bolt for permitting said conical bonnet to be turned on said outer thread of said faucet body in either direction;

said handle being turned on said conical bonnet permitting said curved bottom end of said stop member to pass from said low-level surface over said longitudinal stop edge when said rear projecting bar of said stop member is pulled backwards to move said curved bottom end of said front stop bar away from said conical bonnet.

* * * * *